Patented Dec. 8, 1931

1,835,203

UNITED STATES PATENT OFFICE

HERMAN A. BRUSON, OF GERMANTOWN, PENNSYLVANIA, ASSIGNOR TO ROHM & HAAS COMPANY, OF PHILADELPHIA, PENNSYLVANIA

PLASTICIZER FOR CELLULOSIC DERIVATIVES

No Drawing.   Application filed August 28, 1930. Serial No. 478,563.

This invention pertains to the production of plastic materials, derived from certain hydroxylated monobasic acids and polyhydric alcohols.

The object of this invention is to produce materials which can be incorporated with nitro-cellulose and used in coating compositions to produce greater adhesion, toughness, and flexibility of the film.

I have found that materials of the above nature may be obtained by heating to reaction temperature, a mixture of a polyhydric alcohol and a hydroxy or polyhydroxy monobasic acid of the aliphatic series, said acid having the general formula

$$C_nH_{2n-y}O_2(OH)_y$$

wherein "$n$" is a whole number equal to 18 or 22 and "$y$" is a whole number between 1 and 6 inclusive. Typical examples of such acids are:

Monohydroxystearic acid, $C_{18}H_{35}O_2(OH)$,
Dihydroxy-stearic acid, $C_{18}H_{34}O_2(OH)_2$,
Trihydroxy-stearic acid, $C_{18}H_{33}O_2(OH)_3$,
Tetrahydroxy-stearic acid, $C_{18}H_{32}O_2(OH)_4$,
Hexahydroxy-stearic acid, $C_{18}H_{30}O_2(OH)_6$,
Dihydroxy-behenic acid, $C_{22}H_{42}O_2(OH)_2$, and the like, it being understood that all isomers thereof are included herein.

These acids are readily obtained by oxidizing unsaturated oils of vegetable or animal origin with dilute, alkaline permanganate solutions or by other means, such as by the action of sulphuric acid on unsaturated fatty acids obtained from the hydrolysis of fatty glycerides.

In practicing my invention, preferably equi-molecular quantities of the polyhydric alcohol and the hydroxy acid are heated together with stirring at a suitable temperature. The temperature employed depends upon the boiling point of the alcohol used, varying from about 175° C. to 240° C. A good working temperature is 200–210° C. The heating is conducted in a kettle which allows the water vapor to escape. Apparently an interesterification takes place between the hydroxyl groups and carboxyl groups of the acid as well as between the acid and the polyhydric alcohol. The final product obtained is a neutral ester whose properties depend greatly upon the polyhydric alcohol which is employed.

In general, it has been found that dihydric alcohols such as ethylene glycol trimethylene glycol, diethylene glycol, and the like when heated with the above acids tend to produce viscous oils, whereas polyhydric alcohols containing more than two hydroxyl groups, such as glycerol, polyglycerol, mannitol, and pentaerithrite tend to produce rubbery solids or waxy materials.

In the case of those products prepared from polyhydric alcohols having more than two hydroxyl groups, it has been observed that the resin passes through three distinct stages which may be designated as the A, B, and C, stage.

At first a clear liquid is obtained ("A" stage) which upon continued heating forms a plastic rubbery material ("B" stage) that dissolves readily in toluene or butyl acetate, and finally after considerable prolonged heating forms a tough plastic mass ("C" stage) which cannot readily be melted without decomposition, and which is insoluble in the common organic solvents. The "B" stage product obtained as above can be poured out while hot and cooled, or it may be cut with a solvent such as butyl acetate to prevent formation of the "C" stage material. In this form it can readily be incorporated in nitrocellulose or other cellulosic lacquers, varnishes and similar coating compositions, either alone or admixed with oils, resins, pigments, driers, solvents, and other materials used in preparing coatings.

The "C" stage product may be dispersed in organic solvents by milling it with a solvent upon steel rolls such as are used for milling rubber, or by other mechanical means such as a colloid mill, paint grinder, etc. Solutions obtained thereby are stable and may be used in coating compositions as described above for the "B" stage material.

On account of their neutral reaction and their saturated nature, these plastic materials do not react with basic pigments nor do they absorb oxygen and lose their flexibility. They afford a useful method of contributing elasticity and toughness to brittle resins such as ester gum, phenol-aldehyde resins, urea formaldehyde resins, and the like and may be moulded with such materials and inert fillers if desired to obtain toughened resins. They serve as excellent flexibilizing agents for nitro-cellulose, being readily compatible therewith and giving clear, adherent films of good waterproofness.

As illustrating my invention, the following examples are given:

Example 1

108 grams of dihydroxy-stearic acid, such as is obtained by alkaline permanganate oxidation of oleic acid, are heated with stirring at 220–235° C. with 20 grams glycerol. After about 4 hours heating a clear, thin liquid is obtained which upon further heating becomes viscous and rubbery. When removed at this point and cooled, or else cut with an equal volume of toluene, a product corresponding to the "B" stage is obtained. This material may be mixed in all proportions with solutions of nitro-cellulose in the usual solvent mixture such as butyl acetate-toluene (1:1). Such solutions upon evaporation deposit a transparent, adherent flexible film if the proportion of resin to nitro-cellulose is 1½ to 1. Other proportions may be used.

If the plastic material is not allowed to cool, but is heated further for 6 or 7 hours it sets to a firm gel which can no longer be stirred. When cold, this material is a tough rubber-like mass. 100 parts of this "C" stage material is macerated on steel rollers of a rubber mill together with small quantities of toluene until the product forms a paste which disperses completely in toluene. Such a solution resembles a solution of natural rubber. It is compatible with nitro-cellulose and may be incorporated in lacquers as outlined above.

In place of glycerol, one may use polyglycerol, pentaerithrite, mannitol or other polyhydric alcohol in the above reaction. Good results are obtained by employing sufficient polyhydric alcohol to allow an excess of hydroxyl groups over that theoretically required to combine with the carboxyl group of the hydroxy-acid used, but this is not absolutely necessary.

Other hydroxy acids of the formula

$$C_nH_{2n-y}O_2(OH)_y$$

as described herein may be used in lieu of the dihydroxy-stearic acid. If desired, oils such as linseed oil, castor oil, rape seed oil or other similar oil may be added to the reaction mass during the heating process in order to obtain a dispersion of the resin in the oil. The addition of fatty acids derived from natural oils, such as linseed oil fatty acids, tung oil acids, castor oil fatty acids and the like may also be added to the reaction mass during the heating process in order to obtain products having special drying properties.

Example 2

120 grams trihydroxy-stearic acid such as is obtained by alkaline permanganate oxidation of castor oil, are heated with stirring, with 20 grams glycerol at 235° C. until the "B" stage resin is obtained. This usually requires 8 to 10 hours depending upon the rate of stirring. The material resembles that obtained in Example 1 and may be likewise incorporated with nitro-cellulose. Prolonged heating at 235° C. converts it into the insoluble "C" stage which resembles that obtained in Example 1.

In place of glycerol, one may use glycol, trimethylene glycol, diethylene glycol, mannitol, pentaerithrite and the like. The dihydric glycols however tend to produce viscous liquids which do not readily form "C" stage products.

Example 3

352 grams dihydroxy-behenic acid, such as may be obtained by the alkaline oxidation of rape seed oil, is heated with 35 grams of glycerol at 230° C. with stirring until the mixture forms a tough, rubbery resin.

The above examples are simply indicative of the type of product obtained and the general reaction. It is of course understood that mixtures of any or all of the above mentioned hydroxy-acids may be employed and also that mixtures of polyhydric alcohols may be used. Fatty oils, or fatty acids may likewise be added if desired to obtain better drying characteristics or greater filling power. The resins may be employed for use on leather, rubber, porous materials, wood, metal and other surfaces, in conjunction with cellulosic lacquers, especially nitro-cellulose lacquers.

Having described my invention and given several examples of embodiments thereof, what I claim as new and desire to protect by Letters Patent is:

1. A composition of matter comprising a resinous reaction product of pentaerithrite and 9, 10-dihydroxystearic acid.

2. A composition of matter comprising a resinous reaction product of mannitol and 9, 10-dihydroxystearic acid.

3. A composition of matter comprising a resinous reaction product of glycerol and 9, 10-dihydroxystearic acid.

4. A composition of matter comprising a resinous reaction product of a substance of the class consisting of glycerol, mannitol and pentaerithrite, and a dihydroxystearic acid.

5. A composition of matter comprising a resinous reaction product of glycerol and an acid of the class consisting of polyhydroxylated stearic acid and polyhydroxylated behenic acid.

6. A composition of matter comprising a resinous reaction product of a non-etherified polyhydric alcohol having more than two free hydroxyl groups, and an acid of the class consisting of polyhydroxylated stearic acid and polyhydroxylated behenic acid.

7. A composition of matter comprising a resinous reaction product of a non-etherified polyhydric alcohol having more than two free hydroxyl groups, and an acid of the class consisting of dihydroxystearic acid, trihydroxystearic acid, tetrahydroxystearic acid, hexahydroxystearic acid and dihydroxy behenic acid.

8. A composition of matter comprising the reaction product of a non-etherified polyhydric alcohol having more than two free hydroxyl groups, and a polyhyroxy monobasic acid of the general formula $$C_nH_{2n-y}O_2(OH)_y$$

where "$n$" is a whole number of the group 18 and 22 and "$y$" is a whole number between 2 and 6 inclusive, and acids derived from a natural fatty glyceride.

9. A composition of matter comprising the reaction product of a non-etherified polyhydric alcohol having more than two free hydroxyl groups, and a polyhydroxy monobasic acid having the general formula $$C_nH_{2n-y}O_2(OH)_y$$

wherein "$n$" is a whole number of the group 18 and 22 and "$y$" is a whole number between 2 and 6 inclusive.

10. A composition of matter comprising the reaction product of the compounds described in claim 8 and a natural fatty glyceride.

11. A composition of matter comprising the reaction product of the compounds described in claim 9 and a natural fatty glyceride.

12. A composition of matter comprising the reaction product of the compounds described in claim 9 and linseed oil.

13. A composition of matter comprising a resinous reaction product of glycerol and an acid of the formula given in claim 8.

14. A process for preparing a resinous material which consists in heating at reaction temperature a mixture of a non-etherified polyhydric alcohol having more than two free hydroxy groups and a polyhydroxy, monobasic acid having the general formula $$C_nH_{2n-y}O_2(OH)_y$$

wherein "$n$" is a whole number of the group 18 and 22 and "$y$" is a whole number between 2 and 6 inclusive.

15. A process as described in claim 14 characterized by the fact that a substance of the group consisting of natural fatty glycerides, acids derived from natural fatty glycerides, and mixtures of these two materials is added to the reaction mixture.

In testimony whereof I affix my signature.

HERMAN A. BRUSON.